United States Patent
Lunt

(10) Patent No.: US 9,525,747 B2
(45) Date of Patent: Dec. 20, 2016

(54) METHOD AND SYSTEM FOR PROCESSING PUBLISHED CONTENT ON THE INTERNET

(71) Applicant: Google Inc., Mountain View, CA (US)

(72) Inventor: Eric M. Lunt, Barrington, IL (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/850,102

(22) Filed: Sep. 10, 2015

(65) Prior Publication Data

US 2016/0006826 A1 Jan. 7, 2016

Related U.S. Application Data

(63) Continuation of application No. 14/472,657, filed on Aug. 29, 2014, now Pat. No. 9,154,567, which is a continuation of application No. 14/136,490, filed on Dec. 20, 2013, now Pat. No. 8,868,691, which is a continuation of application No. 13/523,241, filed on Jun. 14, 2012, now Pat. No. 8,621,048, which is a continuation of application No. 12/480,996, filed on Jun. 9, 2009, now Pat. No. 8,239,494, which is a continuation of application No. 10/999,490, filed on Nov. 30, 2004, now Pat. No. 7,640,184.

(51) Int. Cl.
*G06F 15/16* (2006.01)
*H04L 29/08* (2006.01)
*G06Q 30/02* (2012.01)
*H04L 12/58* (2006.01)

(52) U.S. Cl.
CPC .............. *H04L 67/26* (2013.01); *G06Q 30/02* (2013.01); *G06Q 30/0243* (2013.01); *G06Q 30/0244* (2013.01); *G06Q 30/0277* (2013.01); *H04L 51/24* (2013.01)

(58) Field of Classification Search
CPC    G06Q 30/02; G06Q 30/0243; G06Q 30/0277; G06Q 30/0244; H04L 67/26
USPC ........... 709/204, 219; 725/14, 25, 27, 46, 47
See application file for complete search history.

(56) References Cited

U.S. PATENT DOCUMENTS

| | | |
|---|---|---|
| 6,285,985 B1 | 9/2001 | Horstmann |
| 6,366,933 B1 | 4/2002 | Ball |
| 6,564,380 B1 * | 5/2003 | Murphy ................. H04N 7/147 348/207.11 |
| 6,807,558 B1 | 10/2004 | Hassett |
| 6,917,960 B1 | 7/2005 | Decasper |
| 7,018,295 B2 | 3/2006 | Sakaguchi |
| 7,177,929 B2 * | 2/2007 | Burbeck ........... H04L 29/12009 709/200 |

(Continued)

OTHER PUBLICATIONS

Connected: An Internet Encyclopedia, 5.2 Base64 Content-Transfer-Encoding, Freesoft.org, Oct. 4, 2004, 3 pages.

(Continued)

*Primary Examiner* — Anthony Mejia
(74) *Attorney, Agent, or Firm* — Fish & Richardson P.C.

(57) ABSTRACT

Disclosed is a method for processing content published on-line so as to identify each item in a unique manner. In some implementations, an RSS feed is received from a publisher and a unique identifier is identified for each item in the feed. Each item then has third party content or advertisements associated with the item based on the unique identifier. The feed is then stored and, when appropriate, updated. The augmented feed, which contains the third party content and the items in the feed, is provided to user devices.

20 Claims, 7 Drawing Sheets

(56) References Cited

U.S. PATENT DOCUMENTS

| | | | |
|---|---|---|---|
| 7,337,214 B2 | 2/2008 | Douglass | |
| 7,392,306 B1* | 6/2008 | Donner | H04L 12/581 709/203 |
| 7,421,454 B2* | 9/2008 | DeShan | G06Q 30/02 |
| 7,624,172 B1* | 11/2009 | Austin-Lane | G06Q 30/02 709/203 |
| 7,634,535 B2 | 12/2009 | Watson | |
| 7,797,421 B1* | 9/2010 | Scofield | G06F 15/173 709/203 |
| 7,818,232 B1 | 10/2010 | Mead | |
| 7,895,076 B2* | 2/2011 | Kutaragi | A63F 13/77 705/14.4 |
| 8,028,092 B2* | 9/2011 | Brown | G06Q 30/02 709/217 |
| 8,064,577 B2* | 11/2011 | Lemieux | G06Q 40/04 379/88.12 |
| 8,316,128 B2* | 11/2012 | Beck | G06Q 10/107 709/204 |
| 8,504,711 B1 | 8/2013 | Lunt | |
| 2001/0047297 A1 | 11/2001 | Wen | |
| 2002/0052916 A1* | 5/2002 | Kloba | G06F 17/30902 709/203 |
| 2003/0033209 A1 | 2/2003 | Minear | |
| 2003/0052999 A1 | 3/2003 | Weber | |
| 2003/0097453 A1 | 5/2003 | Fuchigami | |
| 2004/0003118 A1* | 1/2004 | Brown | G06Q 30/02 709/246 |
| 2004/0215718 A1 | 10/2004 | Kazmi | |
| 2005/0015491 A1* | 1/2005 | Koeppel | G06F 17/30867 709/226 |
| 2005/0038717 A1 | 2/2005 | McQueen | |
| 2005/0165615 A1* | 7/2005 | Minar | G06Q 30/02 715/236 |
| 2005/0188078 A1 | 8/2005 | Kotzin | |
| 2005/0198125 A1* | 9/2005 | Macleod Beck | G06Q 10/107 709/204 |
| 2005/0240489 A1* | 10/2005 | Lambert | G06Q 30/0621 705/26.5 |
| 2005/0267973 A1* | 12/2005 | Carlson | G06Q 30/06 709/228 |
| 2005/0289468 A1* | 12/2005 | Kahn | G06F 17/3089 715/738 |
| 2006/0026113 A1 | 2/2006 | Omoigui | |
| 2006/0073812 A1* | 4/2006 | Punaganti Venkata | H04L 67/26 455/412.1 |
| 2006/0095507 A1* | 5/2006 | Watson | G06F 17/30867 709/203 |
| 2006/0230021 A1* | 10/2006 | Diab | G06F 17/30873 |
| 2006/0248209 A1 | 11/2006 | Chiu | |
| 2007/0038516 A1 | 2/2007 | Apple | |
| 2007/0073934 A1* | 3/2007 | Rogers | G06F 9/4443 710/59 |
| 2007/0094081 A1 | 4/2007 | Yruski | |
| 2007/0100900 A1* | 5/2007 | Gibbins | H04Q 9/00 |
| 2007/0118619 A1* | 5/2007 | Schwesig | G11B 27/031 709/219 |
| 2007/0168483 A1 | 7/2007 | Lunt | |
| 2008/0126476 A1* | 5/2008 | Nicholas | G06Q 10/10 709/203 |
| 2008/0141117 A1 | 6/2008 | King | |
| 2008/0306959 A1* | 12/2008 | Spivack | G06F 17/3089 |
| 2008/0319953 A1* | 12/2008 | DeShan | G06Q 30/02 |
| 2009/0006201 A1 | 1/2009 | Faseler | |
| 2009/0019061 A1* | 1/2009 | Scannell, Jr. | G06F 17/30905 |
| 2009/0254635 A1 | 10/2009 | Lunt | |
| 2012/0010867 A1* | 1/2012 | Eder | G06F 19/3437 703/13 |

OTHER PUBLICATIONS

Feedburner, About Syndication, RSS, and Other Web-Altering Chemicals, FeedBurner.com, Jun. 30, 2004, 2 pages.
Fish & Richarson P.C., Amendment in Reply to Office Action dated Oct. 29, 2008 in U.S. Appl. No. 11/483,690, filed Jan. 29, 2009, 12 pages.
Heather Green, All the News You Choose-on One Page, News Analysis & Commentary, Oct. 25, 2004, 1 page (p. 46).
Heintz, Tschabitscher, How Base64 Encoding Works, About, Inc., Oct. 4, 2004, 3 pages.
John Walker, Base64 Encode and Decode Base64 Files, Fourmilab.ch, Feb. 20, 2001, 4 pages.
Python Library Reference, 12.12 Base64-Encode and DeCode MIME Base64 Data, Python.org, May 20, 2004, 2 pages.
RSS Reader, "About Syndication, RSS, and Other Web-Altering Chemicals", Jun. 3, 2005, FeedBurner 2004-2005, BurningdoorSyndicationServices,Inc. (http://powerreader.blogspot.com/2005/06/about-syndication-rss-and-other-web.html), pp. 1-4.
USPTO Non-Final Office Action in U.S. Appl. No. 11/483,690, mailed Oct. 29, 2008, 9 pages.
USPTO Final Office Action in U.S. Appl. No. 11/483,690, mailed May 12, 2009, 7 pages.
Wikipedia, RSS (Protocol), Wikipedia the Free Encyclopedia, Nov. 11, 2004, 2 pages.
USPTO Notice of Allowance in U.S. Appl. No. 14/136,490, mailed Apr. 17, 2014, 10 pages.

* cited by examiner

| alias | channel | title | link | summary | language | | | | | body/content | other elements |
|---|---|---|---|---|---|---|---|---|---|---|---|
| RSS 0.9 | /rdf:RDF/channel | title | link | description | | | | | | | |
| RSS 0.91 | /rss/channel | title | link | description | language | | | | | | |
| RSS 0.92 | /rss/channel | title | link | description | language | | | | | | |
| RSS 0.93 | /rss/channel | title | link | description | language | | | | | | |
| RSS 2.0 | /rss/channel | title | link | description | language | | | | | | |
| RSS1.0 | /rdf:RDF/channel | title | link | description | dc:language | | | | | | |
| Atom 0.3 | /atom:feed | title | link | tagline | xml:lang | | | | | | |
| | Image | url | title | link | width | height | description | | | | |
| RSS 0.9 | image | url | title | link | | | | | | | |
| RSS 0.91 | image | url | title | link | | width | height | description | | | |
| RSS 0.92 | image | url | title | link | | width | height | description | | | |
| RSS 0.93 | image | url | title | link | | width | height | description | | | |
| RSS 2.0 | image | url | title | link | | width | height | description | | | |
| RSS1.0 | image | url | title | link | | width | height | description | | | |
| Atom 0.3 | link [@rel='icon'] | image/url | image/title | image/link | | | | | | | |
| | copyright | managing Editor | web Master | pubDate | lastModified | category | generator | | | | |
| RSS 0.9 | | | | | | | | | | | |
| RSS 0.91 | copyright | managingEd | webMaster | pubDate | lastBuildDate | | | | | | |
| RSS 0.92 | copyright | managingEd | webMaster | pubDate | lastBuildDate | | | | | | |
| RSS 0.93 | copyright | managingEd | webMaster | pubDate | lastBuildDate | | | | | | |
| RSS 2.0 | copyright | managingEd | webMaster | pubDate | lastBuildDate | category | generator | | | | |
| RSS1.0 | copyright | dc:creator | dc:publisher | dc:date | | dc:subject | admin:generatorAgent | | | | |
| Atom 0.3 | copyright | author | | | | | generator | | | | |
| | other elements | item | title | link | summary | category | author | pubDate | uid | | |
| RSS 0.9 | textinput | item | title | link | description | category | author | | @uid | | |
| RSS 0.91 | textinput (and sub- | item | title | link | description | | | | | | |
| RSS 0.92 | textinput (and sub- | item | title | link | description | category | | | | | source, enclosure |
| RSS 0.93 | textinput (and sub- | item | title | link | description | category | | | | content:encoded | source, enclosure", expirationDate |
| RSS 2.0 | textinput (and sub- | item | title | link | description | category | author | pubDate | guid | content:encoded | source, enclosure, comments |
| RSS1.0 | textinput | item | title | link | description | dc:subject | dc:creator | dc:date | rdf:about | content:encoded | |
| Atom 0.3 | id, contributor, info | entry | title | link | summary | dc:subject | dc:creator | issued | id | content | contributor, modified, created |

FIG. 5

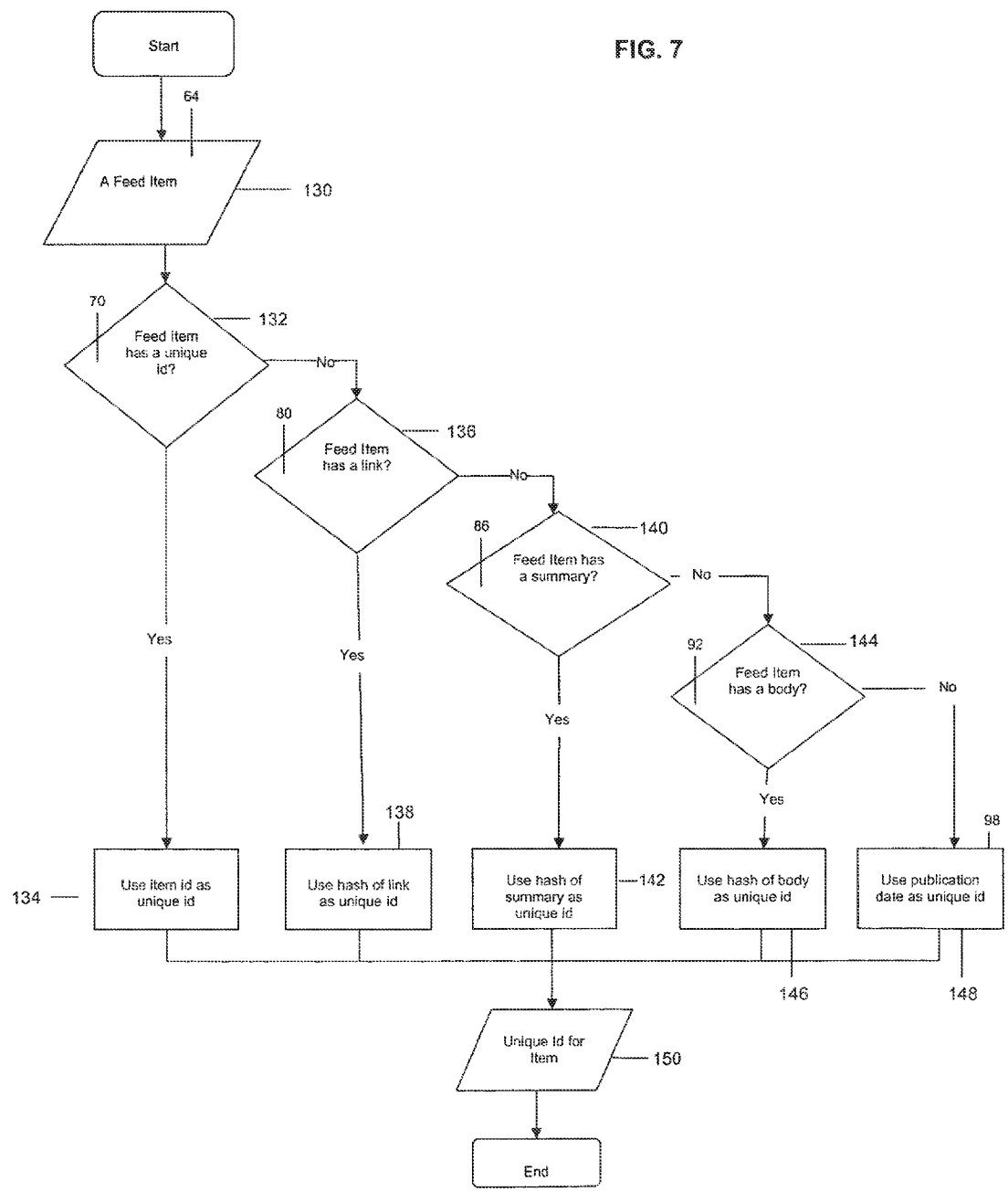

METHOD AND SYSTEM FOR PROCESSING PUBLISHED CONTENT ON THE INTERNET

CROSS-REFERENCE TO RELATED APPLICATIONS

This application is a continuation application of and claims priority under 35 U.S.C. §120 to U.S. application Ser. No. 14/472,657, titled "METHOD AND SYSTEM FOR PROCESSING PUBLISHED CONTENT ON THE INTERNET, filed on Aug. 29, 2014, which is a continuation of U.S. application Ser. No. 14/136,490, titled "METHOD AND SYSTEM FOR PROCESSING PUBLISHED CONTENT ON THE INTERNET," filed on Dec. 20, 2014 and issued as U.S. Pat. No. 8,868,691, which is a continuation of U.S. application Ser. No. 13/523,241, titled "METHOD AND SYSTEM FOR PROCESSING PUBLISHED CONTENT ON THE INTERNET," filed on Jun. 14, 2012 and issued as U.S. Pat. No. 8,621,048, which is a continuation of U.S. application Ser. No. 12/480,996, titled "METHOD AND SYSTEM FOR PROCESSING PUBLISHED CONTENT ON THE INTERNET," filed on Jun. 9, 2009 and issued as U.S. Pat. No. 8,239,494, which is a continuation of U.S. application Ser. No. 10/999,490, titled "METHOD AND SYSTEM FOR PROCESSING PUBLISHED CONTENT ON THE INTERNET," filed on Nov. 30, 2004 and issued as U.S. Pat. No. 7,640,182. The disclosure of each of the foregoing applications is incorporated herein by reference.

FIELD OF THE INVENTION

The present invention relates to an automated method and system of processing that allows publishers of on-line content to enhance and modify the content so that the feeds of the content provide useful information to the publisher as well as process the feed so as to provide the customer non-duplicative feeds.

BACKGROUND OF THE INVENTION

The Internet community consists of many on-line publishers. These entities and individuals publish various content and other items on-line for Internet users to read and download. A common example of an Internet publication is a news service web site. In addition, BLOGS also have become an extremely popular form of on-line publishing.

In many instances, the on-line publisher will syndicate its materials. On-line publishers generally have long known of and used on-line syndication. On-line syndication essentially consists of on-line publishers providing their content to third parties. The third parties provide access to the content via other channels, effectively reaching a wider audience. Many publishers enable daily emails to Internet users who wish to receive "headlines" or other new items. Moreover, many of these services regularly update the site, service and/or content with new items. Some of these sites even alert users when the publisher has updated the site. In this manner, readers of the content can enjoy fresh, updated content on a regular basis, without the need for the user to go back to the web site every time it would like to refresh the content.

On-line publishers use various tools in publishing the material on the Internet. For example, RSS and ATOM constitute the most common forms of a syndication standard. RSS is based on XML, a widely used standard for information exchange between applications on the Internet. ATOM is another standard. These standards allow publishers to send "feeds" around the Internet, particularly to aggregators. Consumers obtain RSS reader applications, which work with the aggregator software, to receive, collect and monitor their favorite feeds.

Many publishers distribute the feeds to Internet users for free. As such, publishers seek to obtain revenue from third party materials, such as advertisements, that publishers associate with the published content. For example, a publisher of a sports feed may seek to have a gym shoe manufacturer pay to place an advertisement on the feed so that when a user reviews the content, the user also will see the ad. Publishers have used this form of Internet advertising for a long time and it is a well established source of revenue.

To maximize the revenue, the publisher often will "rotate" the advertisements. In other words, three different users looking at the same feed item may see three different advertisements. In this manner, the publisher can receive credit for three different "hits" or "eye balls" on the same content.

The biggest challenge with respect to advertisements is being able to rotate the ads without repeating the content. In particular, as noted above, many of the sites regularly update with new content. With each new story, the advertiser can rotate the ads and maximize fees. However, the problem occurs when the advertiser wants to rotate the ads, but keep the content the same. For example, when a user receives some type of alert or notification, for example, a ping, instant message email or some other type of notice that a publisher has updated a site with a new content, the user assumes that he or she will read a new story; but, often, the user receives a false message. Specifically, because the publisher tries to maximize advertisements, the publisher will rotate the ads on an old story. This action often results in an unintended alert to the user. In such cases, the user merely sees the same, previously viewed content, but with new advertisements. This skews advertising scoring and limits the amount of additional services that can be provided to the syndicated feed because of the limitation on the rotating of the advertisements. In other words, the advertiser cannot get an accurate statistical count or determine user profiles because the story has not changed, but only the advertisement, and therefore it is not possible to determine the users preference. Moreover, users often become frustrated and annoyed by such situations and publishers risk alienating clients by ad rotation; however, publishers depend on attaching as many advertisements to content as possible to augment revenue.

SUMMARY OF THE INVENTION

The present invention provides a unique, novel system whereby the invention permanently associates third party or advertising content to a particular feed item. Initially, a publisher of on-line content will create a RSS or ATOM XML file for the feed (but other formats may be used). The system of the present invention, acting as an aggregator, will process the feed. Specifically, in one of the embodiments of the present invention, the publisher will provide the URL for the publisher's valid RSS or ATOM XML file, or, the publisher will provide a URL for a webpage that contains a link to the publisher's valid RSS or ATOM file. In the latter case, acting as an aggregator, the invention will visit the webpage and attempt to "autodiscover" the RSS or ATOM URL. The invention then retrieves the feed that is located at this URL, and determines whether or not it is a valid RSS or ATOM XML file. If the source feed is valid, the system contacts the publisher and offers the publisher a variety of services which the invention can perform with respect to enhancing the feed. Such services include merging feeds of downloadable music files into news feeds, feed-driven advertising banners, language translation, and providing other services around rich media in feeds.

Once the system performs any services selected by the publisher on the feed, in this embodiment of the invention, it will then provide the publisher with a URL for the augmented feed. The augmented feed is the result of the execution of the publisher selected services on the source feed.

In addition, the invention will permanently associate the third party content with a feed item. In this manner, the invention prevents the advertisement rotation problem. The invention does this by parsing out the particular feed items and either: (a) identifying a unique identifier to each feed item; or (b) attaching the unique identifier to each feed item. If the invention has previously associated third party content with the item identified by the unique identifier, then the previously stored third party content is appended to the XML item in the feed. If the invention has not previously associated third party content with the item identified by the unique identifier, then the invention creates an association between the third party content and unique identifier, stores the associated content or a reference to the associated content in a file, and then appends the third party content to the XML item in the feed. This process is repeated until there are no more items in the feed to process.

When this process is complete, the invention outputs an augmented feed and provides the publisher with a unique URL that refers to the augmented XML feed. This augmented feed contains all the permanent associations between third party content and the items in the feed. The user often will receive an alert with respect to the feed. Subsequently, as the source feed is modified or extended, the permanent relationships between third party content and previously existing feed items are retained, even with respect to the updated feed for which users receive new alerts.

DESCRIPTION OF THE DRAWINGS

FIG. 5 is a flow chart demonstrating one process in which the system maintains and updates this augmented.

FIG. 7 shows a flow chart illustrating how a feed item receives a unique identifier.

DETAILED DESCRIPTION

Figure 1:
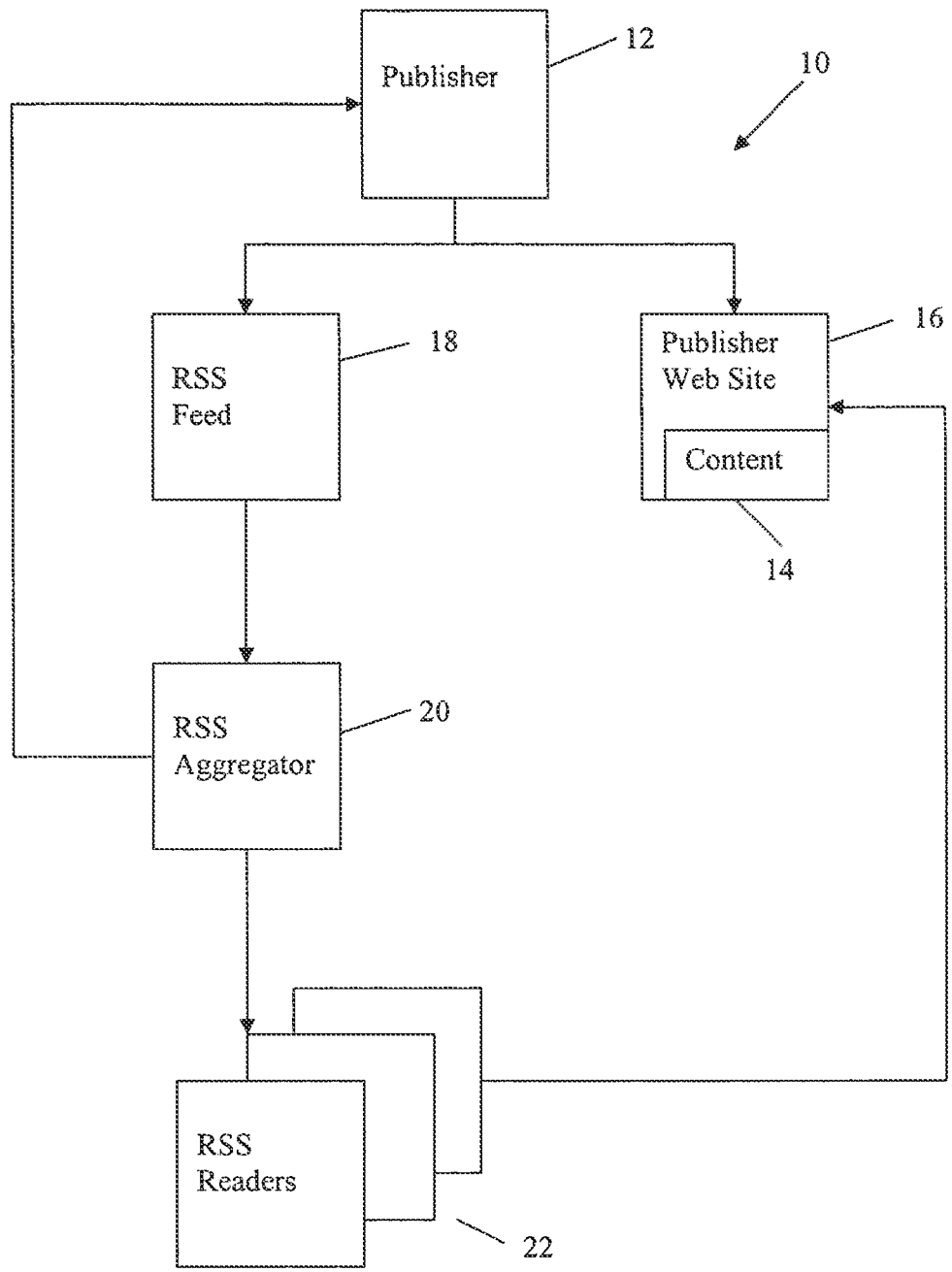
FIG. 1 shows a shows a functional block diagram of the basic components of the present invention.

FIG. 1 shows a functional block diagram of the basic components 10 of the present invention. FIG. 1 shows a publisher 12 which produces content 14 for display via the publishers web site 16. The publisher also provides an RSS feed 118. The RSS feed 18 is provided to an RSS aggregator or system 20 of the present invention. The system 20 of the present invention processes the RSS feed and develops an output to the publisher and an output to various RSS readers 22.

Figure 2:
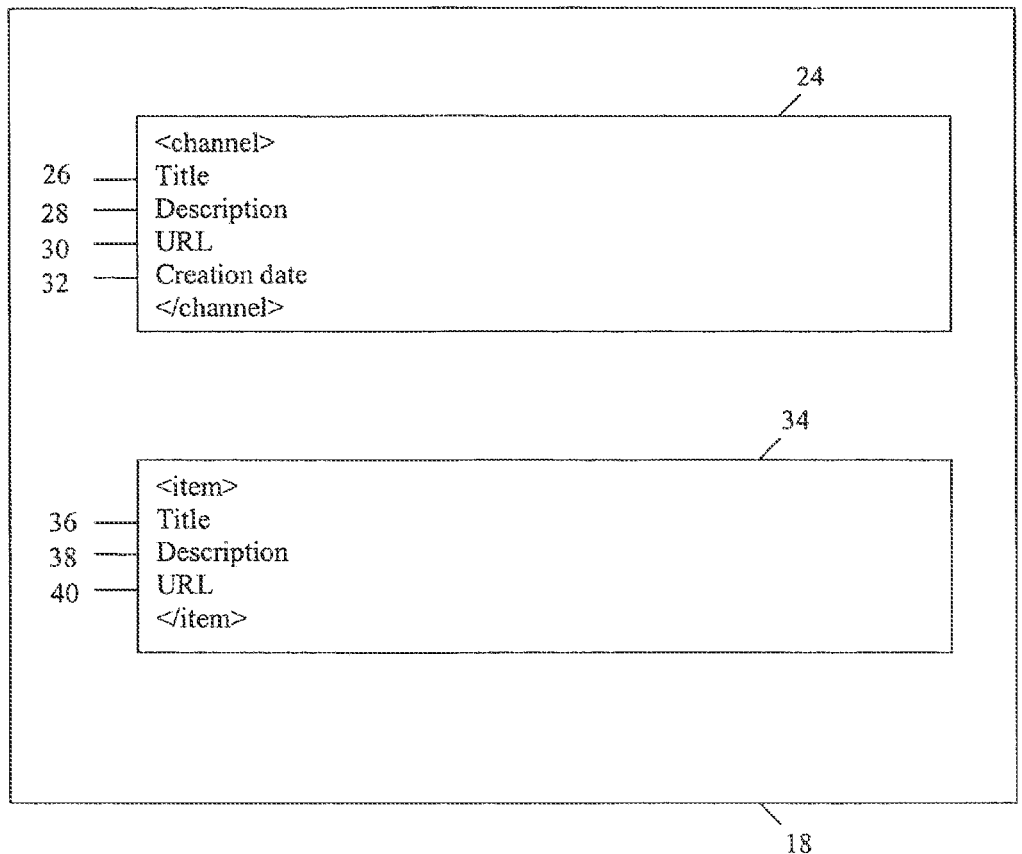
FIG. 2 is a schematic diagram which outlines the basic components of an RSS feed.

FIG. 2 is a schematic diagram which outlines the basic components of an RSS feed 18. The RSS feed 18 includes a channel 24 having a title 26, description 28, URL 30, and creation date 32. The RSS feed 18 also includes one or more items 34. Each item 34 may include a title 36, description 38 and URL 40. The RSS feed 18 may include other components as is known in the art.

Figure 3:
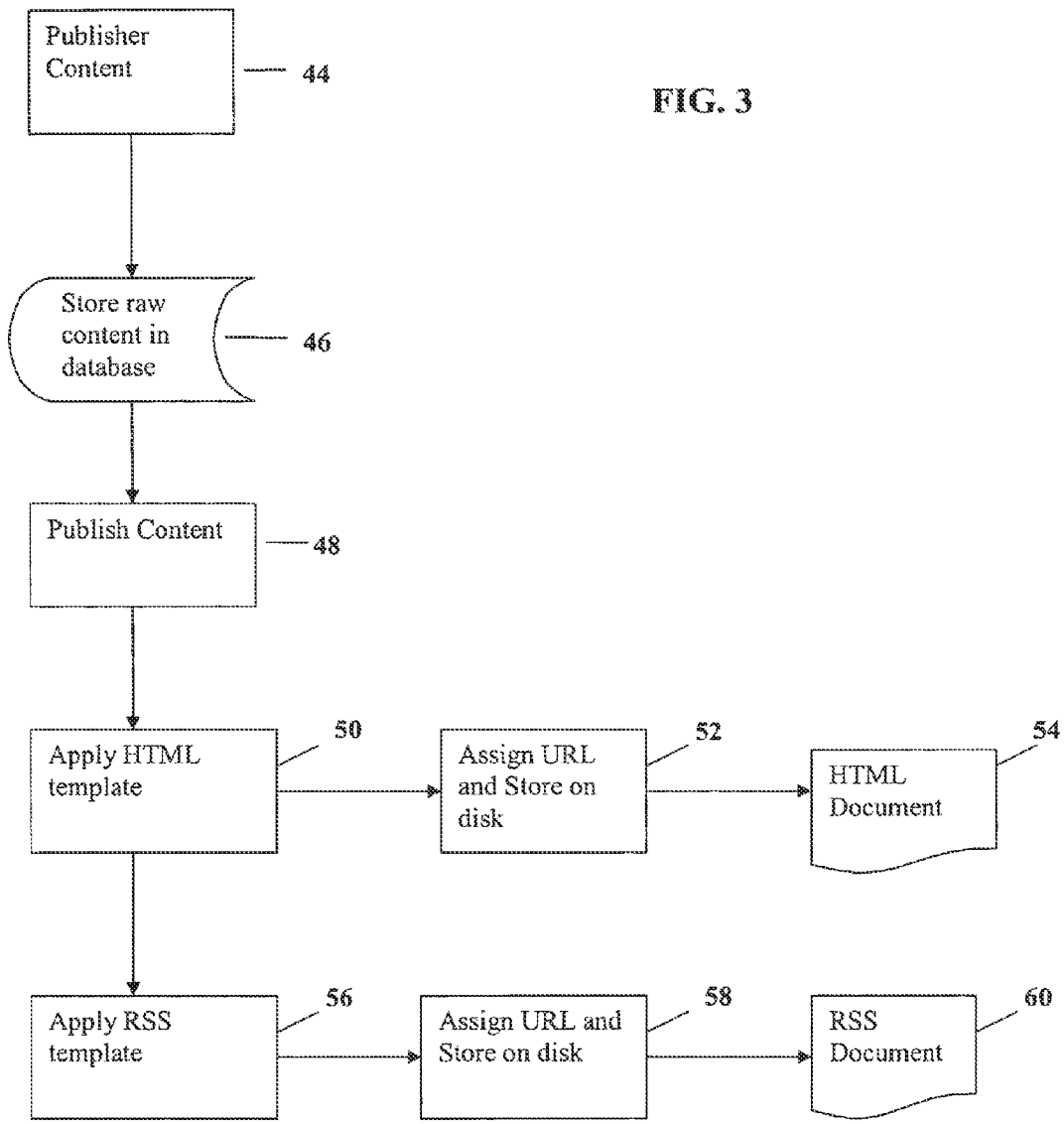
FIG. 3 shows an illustrative process of how a publisher creates content for publication.

FIG. 3 shows an illustrative process of how a publisher 12 creates content 14 for publication via the web site 16, and an RSS or ATOM document or feed 18 for syndication. Of course formats other than RSS or ATOM will also be appreciated. The RSS feed 18 will be used in communication with the RSS aggregator or system 20 of the present invention as described below.

The publisher creates or provides content 14 at step 44 and stores the content 14 in a database at step 46. The publisher 12 then publishes the content 14 at step 48 and applies an HTML template at 50 to the content 14. The publisher 12 then assigns a URL and saves to a disk at 52. The end result is an HTML document as shown at step 54. The HTML document is viewable at the publishers web site 16 at the corresponding URL. If the publisher also desires to syndicate the content 14, then the publisher also applies an RSS template at 56. The publisher 12 then assigns a URL and saves to a disk at 58. The end result is an RSS document or feed 18 as shown at step 60. It should be understood that the preceding represent examples for illustrative purposes and there are other ways to practice the invention.

Figure 4:
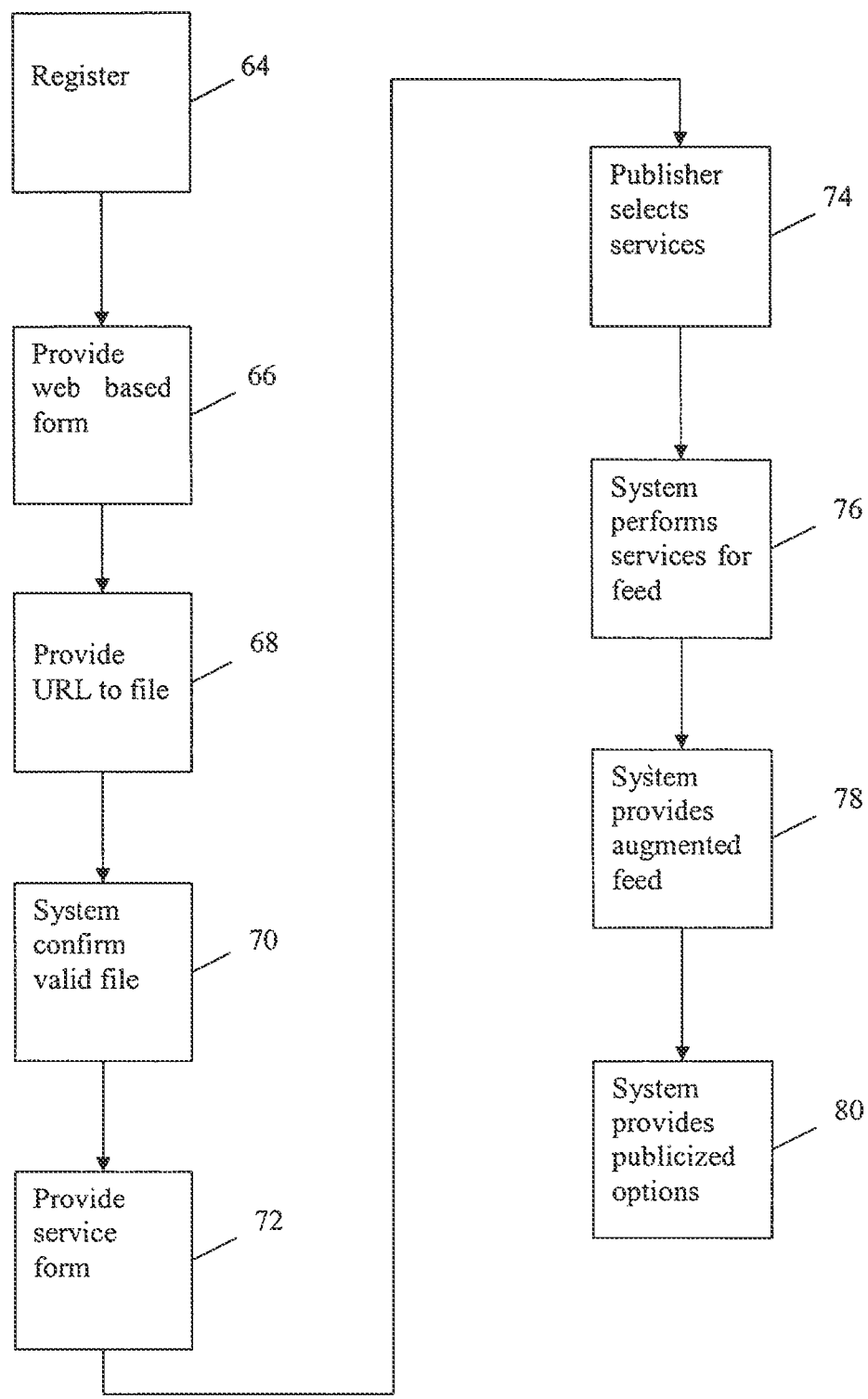
FIG. 4 shows a flow chart demonstrating how a feed item is processed by the RSS aggregator or system of the present invention.

FIG. 4 shows a flow chart of a series of steps which may be carried out by software under the control of the system 20. The publisher visits a website or other access point of the system 20 and registers, as shown at 64. The system 20 then provides at 66 a web based form on the web site and prompts for an RSS feed 18. At step 68, the publisher 12 may either provide a URL for a valid RSS or ATOM XML file, or provide a URL for a webpage that contains a link to a valid RSS or ATOM URL. If the publisher chooses the later, the invention will visit the webpage and attempt to "autodiscover" the valid RSS or ATOM URL. The RSS file 18 which is located at this URL is then retrieved at step 70 and confirmed to be valid. If the feed 34 is valid, the system 20 then provides a second form at 72. The second form lists the various enhancement and transformation services that the system 20 is able to execute on the source feed 18. The services include merging feeds of downloadable music files into news feeds, feed-driven advertising banners, language translation, and providing other services around rich media in feeds, as examples. The publisher 12 can then choose various enhancement and transformation services to apply to the feed 18 as shown at 74. Once the publisher has selected all the services, these services are applied to the feed 34 at step 76, whereby the feed 18 becomes an augmented feed as provided at step 78. At step 80, the system provides the publisher 12 with a selection of "Publicize" options that provide the publisher with various ways of alerting subscribers to the availability of the augmented feed. These publicized options include but are not limited to web-based graphics that contain links to the URL for the augmented feed, html text that contains contain links to the URL for the augmented feed and other graphics and html that promote the existence of the augmented feed. Finally, the publisher 12 may then use any of the publicized options on a website 16 to promote the existence of the augmented feed, or the publisher 12 may promote the existence of the augmented feed in other ways.

Once a publisher 12 has created an augmented feed through the system 20, the system 20 maintains and updates this augmented feed as shown in FIG. 5. The system 20 maintains a database relationship between the publisher's RSS feed 18 and the system's augmented feed. The first time a publisher creates an augmented feed, a copy of the RSS feed 18 is stored within the system 20, so that future checks of the source feed can be compared against this stored copy to check for updates. In particular, the process 86 includes an initial step 88 of creating a unique identification for the item 34 in the feed 18. The step 88 is described in greater detail below. At 90, the system 20 extracts the content from the item 34. At step 92, the system checks if the content is stored in cache of the system 20. If the content is not stored in cache, at 94, the system 20 stores the content or hash in cache. At 96, the system then returns a result indicating a content change. If the system 20 determines at 92 that the content is not stored in cache, the system retrieves content from the cache. The retrieved content is compared to the new content at 100. If there is a difference, the system again returns a result indicating a content change at 96. If the content is not different, at 110, the system returns a result indicating no change in content.

There are two ways in which the system 20 can make sure that the augmented feed is up to date. In the first instance, the system will retrieve the source feed every 30 minutes on a continual basis, and if the source feed has been updated since the last time the system checked, the system replaces the source feed it has stored with this new updated source feed. In the other instance, the publisher can implement the publicly available XML-RPC ping interface. This interface is a mechanism that causes the publisher's source feed to notify the system whenever it has been updated. In the case in which the publisher implements the XML-RPC interface, the system will always retrieve and update the stored copy of the source feed whenever a notification is received.

Once the source feed is updated, the system performs all of the augmentation services selected by the publisher against the source feed, and updates its stored version of the augmented feed (aka "The cached version of the augmented feed")

The very first time an HTTP request is made for the augmented feed (typically a subscriber to the publisher's augmented feed asking to read it), the system retrieves its copy of the source feed, performs all of the publisher selected services against the source feed, and sends a copy of the augmented feed in response to the HTTP request. A copy of the augmented feed is then stored (aka cached), and this cached version of the augmented feed is then used to service all subsequent HTTP requests for the augmented feed until the system determines that the augmented feed needs to be updated, based on updates to the source feed.

Figure 6:
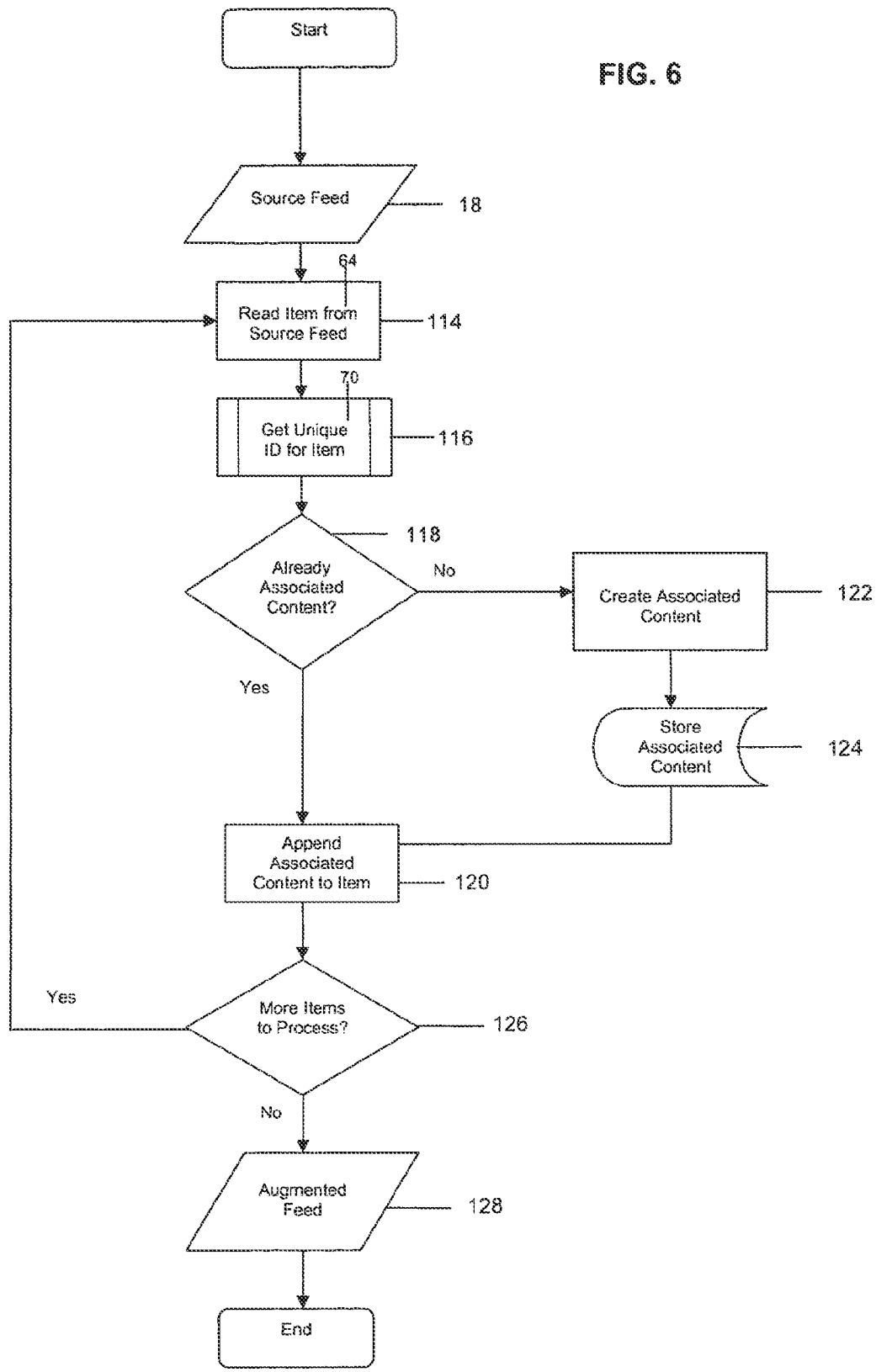
FIG. 6 shows a flow chart illustrating how the to associate third party content with a feed item.

In this embodiment of the present invention, a number of steps are required in order to permanently associate third party content with a feed item 64. As seen in FIG. 6, in step 114 in the process, the feed 34 is read and parsed to begin the process of associating third party content with the feed items 64. In the next step 116, a unique item identifier 70 is retrieved for the particular feed item 64.

The method for the retrieval of a unique item identifier 70 is demonstrated most clearly in FIG. 7. The first step 130 in the process is to obtain the feed item 64. Next, it is determined whether the feed item 64 has a unique item identifier 70 at 132. If a unique item identifier 70 has been embedded in the feed item 64, the unique item identifier 70 is identified with the corresponding feed item 64 as the unique item identifier 70 at step 134.

Continuing in FIG. 7, if there is no unique item identifier 70, then the next step 136 is to determine whether the feed item 64 has a link XML element 80. Generally speaking, the link 80 is the XML tag for a URL of the feed item 64 being syndicated.

If the feed item 64 has a link XML element 80, at step 138, the link element 80 will be hashed, the result of which is the assignment of the unique item identifier 70 of the feed item 64. While there are varying ways to hash an item, a commonly understood method for hashing includes taking the feed item 64 and applying a publicly understood "secure hash algorithm" to obtain a fixed-length message digest. This digest is then Base64 encoded (a common content-transfer encoding method) to make it suitable for storing in a text-based field. This act results in a "hashcode" that will be a unique item for the source item.

If the feed item 64 has no link XML element 80, at step 140 in FIG. 7, it will then be determined if the feed item 64 has a summary XML element 86. A summary XML element 86 is commonly understood to mean a "short summary of the item being syndicated." If it is determined at step 140 that the feed item 64 has a summary XML element 86, it will be hashed at step 142, the result of which is the assignment of a unique item identifier 70 for the feed item 64.

If the feed item 64 has no summary XML element 86, in step 144 of FIG. 7, it will be determined if the feed item 64 has a body XML element 92. A body XML element 92 is commonly understood to mean the full body of the item being syndicated. This is generally a rich html formatted version of the contents that can be found on the web site address identified by the URL in the link tag. Note that in some cases, the full contents of the web site are not syndicated in the body, generally in cases where the publisher does not desire to syndicate the full contents, but rather desires to syndicate portions of content so that subscribers return to the web site for the full information. It is up to the discretion of the publisher as to how much of the web site contents are syndicated in the body. If is determined at step 144 that the feed item 64 has a body XML element 92, it is hashed at step 94, the result of which is assigned to be the unique item identifier 70 of the feed item 64 at step 146.

If the feed item 64 has no body XML element 92, at step 148, the pubDate XML element 98 is assigned as the unique item identifier 70 for the feed item 64. The pubDate XML element 98 is commonly understood as the date the item was published in some content publishing tool like a weblog engine, expressed in either some standard electronic format, such as either the RFC822 or ISO8601 standard date formats, but other formats may apply.

Step 150 represents the unique identifiers as obtained from any one of steps 134, 138, 142, 146 or 148.

Returning to FIG. 6, in this embodiment of the present invention, it is now determined whether there exists previously associated third party content with the feed item 64 as shown in step 118. If the unique item identifier 70 already has associated third party content, then the previously stored third party content is appended to the item 64 as shown at 120. If the third party content does not exist, at step 122, the third party content is created and stored 124 briefly. Ultimately, this stored third party content is appended to the feed item 64 at step 120. The entire process set forth in FIG. 6 is repeated until there are no more feed items 64 to process as determined at step 126.

In this embodiment, as shown in FIG. 6, after determining there are no more feed items 64 to process at step 108, an augmented feed is produced at step 128. This augmented feed contains all the permanent associations between third party content and the feed items 64. Moreover, as the feed 34 is modified or extended by the publisher, the permanent relationships between third party content and previously existing feed items 64 are retained.

What is claimed is:

1. A method, comprising:
associating, by one or more processors, a content feed including first content from a first content provider and second content from one or more second different content providers with third party content;
receiving, by one or more processors, multiple requests for the content feed from various user devices;
providing, by one or more processors and in response to the multiple requests, various different third party content in the content feed without generating an alert to other user devices that submitted the multiple requests;
transmitting, by one or more processors, an electronic alert to the various user devices based on one of the first content or the second content being changed.

2. The method of claim 1, further comprising:
associating, with the content feed, media content specified by one of the first content provider or the one or more second content providers;
merging the media content into the content feed; and
transmitting, to multiple different user devices, an alert specifying that the media content has been merged into the content feed.

3. The method of claim 2, further comprising rotating third party content presented with the media content without alerting the multiple different user devices.

4. The method of claim 2, wherein the media content is one of a video or music file.

5. The method of claim 1, wherein transmitting an electronic alert comprises providing an email to users associated with at least some of the various user devices.

6. The method of claim 1, further comprising:
receiving, through user interaction with the electronic alert, a request for the content feed; and
providing, in response to receiving the request, an updated version of the content feed based on the change to the one of the first content or the second content.

7. The method of claim 1, further comprising transmitting, to one or more users, information specifying that the content feed is available for viewing.

8. A system comprising:
a data store storing a content feed including first content from a first content provider and second content from one or more second different content providers; and
one or more processors that communicate with the data store and execute instructions that cause the one or more processors to perform operations including:
associating the content feed with third party content;
receiving multiple requests for the content feed from various user devices;
providing, in response to the multiple requests, various different third party content in the content feed without generating an alert to other user devices that submitted the multiple requests;
transmitting an electronic alert to the various user devices based on one of the first content or the second content being changed.

9. The system of claim 8, wherein the instructions cause the one or more processors to perform operations further comprising:
associating, with the content feed, media content specified by one of the first content provider or the one or more second content providers;
merging the media content into the content feed; and
transmitting, to multiple different user devices, an alert specifying that the media content has been merged into the content feed.

10. The system of claim 9, wherein the instructions cause the one or more processors to perform operations further comprising rotating third party content presented with the media content without alerting the multiple different user devices.

11. The system of claim 9, wherein the media content is one of a video or music file.

12. The system of claim 8, wherein transmitting an electronic alert comprises providing an email to users associated with at least some of the various user devices.

13. The system of claim 8, wherein the instructions cause the one or more processors to perform operations further comprising:
receiving, through user interaction with the electronic alert, a request for the content feed; and
providing, in response to receiving the request, an updated version of the content feed based on the change to the one of the first content or the second content.

14. The system of claim 8, wherein the instructions cause the one or more processors to perform operations further comprising transmitting, to one or more users, information specifying that the content feed is available for viewing.

15. A non-transitory computer readable storage medium storing instructions that upon execution by one or more processors, cause the one or more processors to perform operations comprising:
associating a content feed including first content from a first content provider and second content from one or more second different content providers with third party content;
receiving multiple requests for the content feed from various user devices;
providing, in response to the multiple requests, various different third party content in the content feed without generating an alert to other user devices that submitted the multiple requests;
transmitting an electronic alert to the various user devices based on one of the first content or the second content being changed.

16. The non-transitory computer readable storage medium of claim 15, wherein the instructions cause the one or more processors to perform operations further comprising:
associating, with the content feed, media content specified by one of the first content provider or the one or more second content providers;
merging the media content into the content feed; and
transmitting, to multiple different user devices, an alert specifying that the media content has been merged into the content feed.

17. The non-transitory computer readable storage medium of claim 16, wherein the instructions cause the one or more processors to perform operations further comprising rotating third party content presented with the media content without alerting the multiple different user devices.

18. The non-transitory computer readable storage medium of claim 16, wherein the media content is one of a video or music file.

19. The non-transitory computer readable storage medium of claim 15, wherein transmitting an electronic alert comprises providing an email to users associated with at least some of the various user devices.

20. The non-transitory computer readable storage medium of claim 15, wherein the instructions cause the one or more processors to perform operations further comprising:
   receiving, through user interaction with the electronic alert, a request for the content feed; and
   providing, in response to receiving the request, an updated version of the content feed based on the change to the one of the first content or the second content.

\* \* \* \* \*